Sept. 11, 1945. M. S. BALL 2,384,429
TOOL FOR STUFFING PIMIENTO AND THE LIKE
Filed Aug. 17, 1943
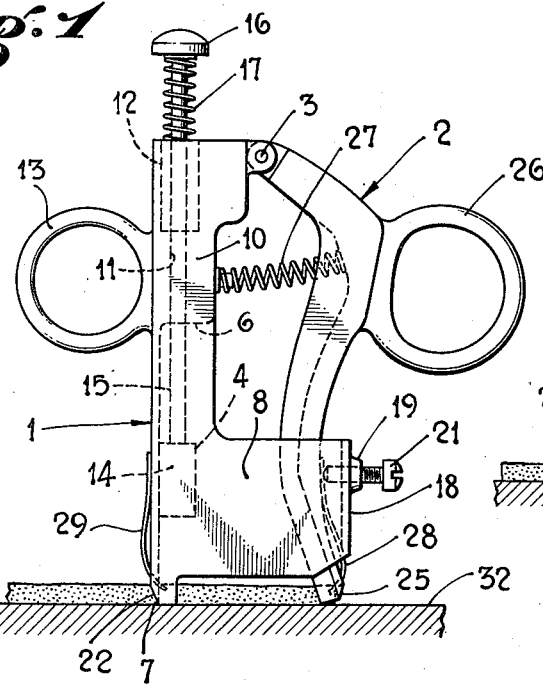
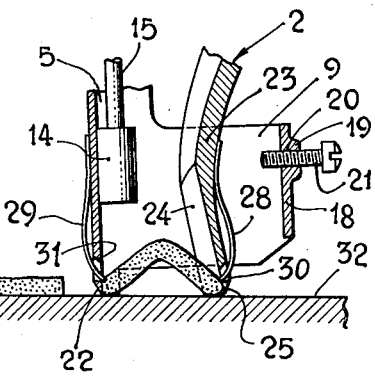
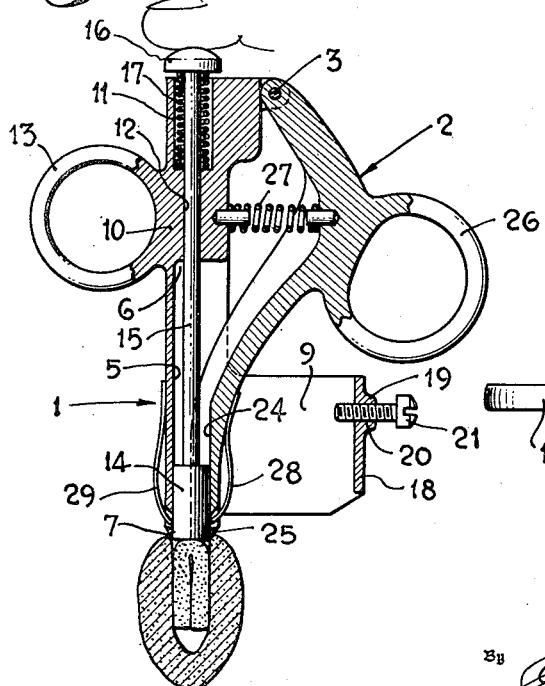
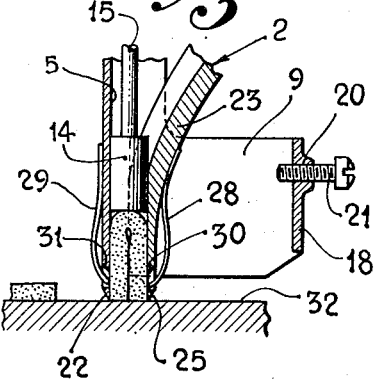
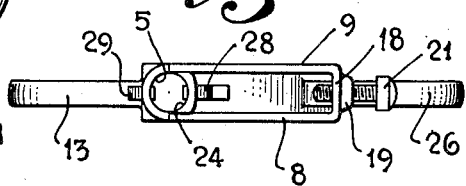
Inventor:
MILDRED S. BALL;
By Calvin Brown,
Attorney.

Patented Sept. 11, 1945

2,384,429

UNITED STATES PATENT OFFICE 2,384,429

TOOL FOR STUFFING PIMENTO AND THE LIKE

Mildred S. Ball, Visalia, Calif., assignor to Pacific Olive Company, Visalia, Calif., a copartnership consisting of E. Van Dellen, R. N. Ball, and A. W. Stricker Application August 17, 1943, Serial No. 499,025

5 Claims. (Cl. 146—203)

The present invention relates to a tool which is useful in the stuffing of various commodities, such as, for instance, olives with pimento.

At the present time, it is customary to manually stuff green olives with pimento. This requires that the pimento material first be cut to size and threafter folded by hand, and then inserted in the olive pit cavity. This operation requires skilled labor, in that care must be exercised in the stuffing; otherwise the stuffed olive has a defective appearance affecting, as a result, the salability thereof.

The present invention is adapted to cut the pimento to a given length, fold the pimento, and insert the same into the pit cavity of the olive. Use of the device of the invention has been found to increase the output of stuffed olives from 50% to 100% over the conventional hand stuffing method. A time saving is effected whenever the pimento is softer than normal, which makes its manipulation by the hand method extremely difficult or impractical. With the device of the present invention, the softness of the pimento offers no problem.

An olive stuffed by use of the present invention has an improved appearance, since all pimento pieces are folded without breakage. In this respect, it may be pointed out that after an olive is pitted, it is customary to fold a pimento strip so that the smooth surface of said strip is on the outside and the ends of the strip are inserted in the olive cavity with the bight visible at the entrance of the cavity.

Another object of the invention is to provide a device which will rapidly stuff olives. With respect to this object, it may be pointed out that hand stuffing of olives costs for labor alone approximately 90¢ per gallon of olives, whereas by actual test, using the present invention, costs have been reduced to 40¢ per gallon of olives, which represents $25.00 per barrel, for labor alone. Ordinarily, several months are required for a worker to reach top production using the hand method of stuffing, whereas, a few weeks practice with the present invention makes an expert stuffer. Under present conditions as they now exist, this is an important factor, due to the rapid rate of labor turnover.

The device of the present invention is sanitary in that the hand is not used for the purpose of cutting the pimento by the fingernails, as is customarily done by labor, nor are the fingers used in pushing the pimento into the pit cavity of the olive.

The invention is simple of structure, efficient in operation, and low in cost of manufacture.

With the above mentioned and other objects in view, the invention consists in the novel and useful provision, formation, construction, association, and relative arrangement of parts, members and features, all as shown in a certain embodiment in the accompanying drawing, described generally, and more particularly pointed out in the claims.

In the drawing:

Figure 1 is a side elevation of the device of the invention,

Figure 2 is a longitudinal sectional view of the device of Figure 1, showing certain elements in changed position, Figure 3 is an enlarged fragmentary and transverse sectional view showing two elements of the invention in the act of folding a strip of pimento, Figure 4 is a view similar to Figure 3, the pimento strip being completely folded, and, Figure 5 is a bottom plan view of the device of Figure 1.

Referring to the drawing, the improved tool for cutting, folding, and stuffing a material, such as pimento, is shown in Figures 1, 2 and 5, and includes a pair of jaws 1 and 2 hinged together at 3, and a plunger 4 carried by and movable relative to jaws 1 and 2.

The jaws differ structurally. The jaw 1 is recessed or grooved at 5 for a portion of its length between the zones marked 6 and 7 and provided with a pair of wings 8 and 9 forming extensions of the walls bounding the recess 5. Portion 10 is provided with co-axial bores 11 and 12 and said jaw is likewise provided with a finger ring 13. A plunger 14 has its stem 15 passed through the bores 11 and 12, terminating in a finger button 16. A coil spring 17 surrounds the stem and is received within the bore 12, with one end thereof engaging the button 16.

The wings 8 and 9 are substantially parallel and provided with a connecting end piece 18. This end piece is enlarged at 19 and provided with a threaded bore 20 to receive screws 21. It will be noted that the lower edges of the wings are spaced upwardly from the zone 7 of the jaw, and that the zone 7 is provided with a knife edge 22.

The jaw 2 has a portion 23 received between the wings 8 and 9 and this portion is formed with a semi-cylindrical groove 24. The jaw 2 is structurally bent and in such a manner that the semi-cylindrical groove 24 forms with the groove 5 a circular way for guiding the plunger in its downward movement when the jaws are closed, as illustrated in Figure 2. The jaw 2 is provided with a cutting edge 25 and a finger ring 26. A coil spring 27 is positioned between the two jaws for swinging the jaws apart, as illustrated in Figures 1 and 2. Relative separation of the jaws is controlled by the screw 21, the screw engaging the back of the jaw 2.

Both jaws are provided with spring clips 28 and 29. The spring clips, in each instance, constitute narrow elongated leaf springs adapted to be passed through an opening adjacent the cutting edge of each jaw for position within the confines of the groove of each jaw (see Figures 3 and 4, at 30 and 31).

The operation, uses and advantages of the invention are as follows:

The pimento is first cut into strips of the proper width and then laid with the smooth or skin side upwardly on a supporting surface or table, such as shown in the different figures at 32. If the strip is to be of a selected length, the screw 21 is turned to control the degree of separation of the jaws, whereupon the strip may be readily cut by pressing downwardly upon the jaws, which causes the cutting edges 22 and 25 thereof to separate a length of the strip. The thumb of the operator is passed through ring 26 and the second finger through ring 13. The ends of the spring clips 28 and 29 penetrate the pimento strip so that when the jaws are closed, the pimento is folded in the manner depicted in Figures 3 and 4. The pitted olive is held by the left hand with the pit cavity in alignment with the closed jaw ends, whereupon the index finger depresses the plunger button and forces the pimento within the olive cavity, as see Figure 2. This completes the operation, and a releasing of the button withdraws the plunger and the jaws again open, under influence of the spring 27. The ends of the jaws are not lifted upwardly during a folding of the pimento strip but allowed to slide over the table surface 32. During this movement, the spring clips hold the ends of the pimento against the board surface, thus assuring, during a closing movement of the jaws, that the pimento will fold in the manner depicted in Figures 3 and 4.

The invention just described accomplishes all of the objects heretofore set forth, and in actual practice, the device is made of any suitable substance, although stainless steel is preferable from a sanitary standpoint.

I claim:

1. In a device of the character disclosed, a pair of jaws hinged together, each jaw provided with a lengthwise extending semi-cylindrical groove, a plunger carried by one of said jaws, and adapted to be moved co-axially within the semi-cylindrical grooves when the jaws are closed together.

2. A device for cutting and folding pimento strips and the like, including a pair of jaws hinged together, the outermost edge of each jaw formed with a cutting edge, means for regulating the separation between the jaws to cut the pimento strip to selected length by the jaw cutting edges, and means for each jaw for holding the pimento strip at its ends during closing movement of the jaws to fold said pimento strip.

3. A device for cutting and folding pimento strips and the like, including a pair of jaws hinged together, the outermost end of each jaw formed with a cutting edge, means for regulating the separation between the jaws to cut the pimento strip to selected length by the jaw cutting edges, means for each jaw for holding the pimento strip at its ends during closing movement of the jaws to fold said pimento strip, and a plunger carried by one of said jaws for engagement between both said jaws to dislodge the folded pimento strip from between the jaws.

4. A device for folding a food article, such as pimento strip, including a pair of jaws hinged together, said jaws formed with lengthwise-extending complementary grooves adapted when the jaws are closed to form a cylindrical passageway therebetween, and means for both jaws for holding the pimento strip at its ends during a closing movement of the jaws to fold said pimento strip within the cylindrical passageway.

5. A device for folding a food article, such as pimento strip, including a pair of jaws hinged together, said jaws formed with lengthwise-extending complementary grooves adapted when the jaws are closed to form a cylindrical passageway therebetween, means for both jaws for holding the pimento strip at its ends during a closing movement of the jaws to fold said pimento strip within the cylindrical passageway, and a plunger carried by one of said jaws for movement in said cylindrical passageway to dislodge the folded pimento strip from said passageway.

MILDRED S. BALL.